(No Model.)
W. ANDREW.
TUBULAR METAL POST.
No. 511,744. Patented Jan. 2, 1894.
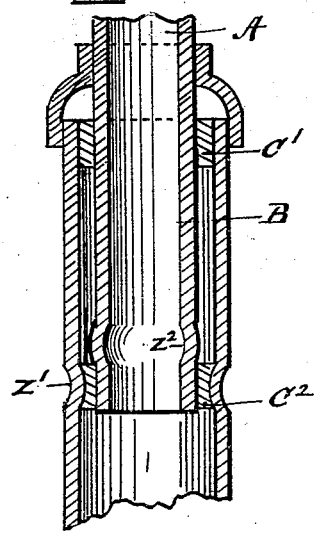
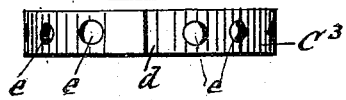
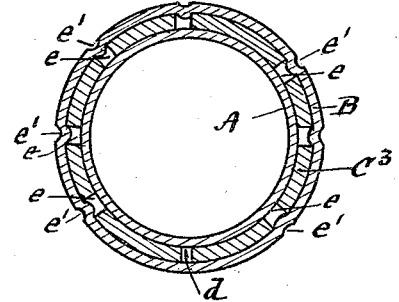
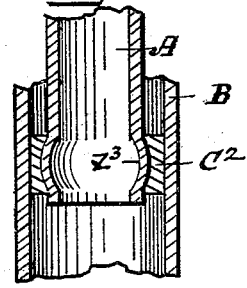
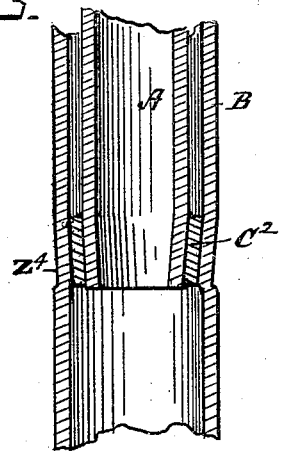
Witnesses
Landon Fraybler
Edith M. English
William Andrew
Inventor
by L. M. Hosea
Attorney

UNITED STATES PATENT OFFICE.

WILLIAM ANDREW, OF CINCINNATI, OHIO.

TUBULAR METAL POST.

SPECIFICATION forming part of Letters Patent No. 511,744, dated January 2, 1894.

Application filed February 7, 1893. Serial No. 461,319. (No model.)

*To all whom it may concern:*

Be it known that I, WILLIAM ANDREW, a citizen of the United States, residing at Cincinnati, Ohio, have invented new and useful Improvements in Tubular Metal Posts, of which the following is a specification.

My invention relates to the tubular metal posts employed in connection with electric street-railways, &c., to maintain the feed-conductors and the cross-supports for the trolley wires; and consists in a construction in which the tubes composing the post are united by compression of the outer tube at certain points or zones, or by expansion of the inner tube at certain points or zones, against an interposed divided ring. The expansion or contraction of the tubes may be into grooves or perforations of the ring, and the ring compressed or expanded as the case may be.

The ultimate object of my invention is to produce a strong supporting post at minimum cost of construction.

My invention is illustrated in the accompanying drawings, in which is embodied and exhibited the principle of the invention with slight variations in structure.

Figures 1, 2, and 3, are axial sections, illustrating various modes of securing the tubes to and together by means of the split rings. Fig. 4, is a view of a perforated ring; and Fig. 5, is a horizontal cross section of the pipes and ring showing the joint.

The complete post is formed of two or more tubes A and B, of different diameters, arranged telescopically—the smaller entering the larger, sufficiently to afford the required strength as a lap-joint.

$C'$, $C^2$, designate split rings occupying the annular space between the tubes at or near the upper end of each, respectively. The upper ring, $C'$, may be slightly wedge-shaped in radial section and of sufficient thickness and diameter to be driven in as an annular wedge and compressed closely against and between the two tubes to make a close fit when driven in. The lower ring is made to fit by compressing the outer tube or expanding the inner tube—or both—against or into it at given zones.

In Fig. 1, the ring, $C^2$, is shown with a slightly grooved periphery, into which the outer tube, B, is compressed at a zone, $Z'$, the effect of which is to compress the ring inwardly against the tube, A. A zone, $Z^2$, of the inner tube, B, may also be expanded at the upper edge of the ring, forming a grooved offset to effectually prevent the tube, A, from settling down by gravity.

In Fig. 2, the ring, $C^2$, is internally grooved and the union is formed by expanding a zone, $Z^3$, of the inner tube, B, outwardly into the groove of the ring, and thus expanding the ring against the outer tube.

In Fig. 3, the union is formed by compressing a wider zone, $Z^4$, of the outer tube, B, in conical form compressing the ring, $C^2$, in like manner, and through it also, the inner tube, A.

In Fig. 5, the ring and its relation to the tubes as an annular filling, are shown, the ring being severed as at $d$, to allow its forcible expansion or contraction, as required.

The construction of a zone of the tube, is effected by placing the tube in a suitable lathe, and causing it to revolve between rolls gradually brought closer together.

The expansion of the inner tube, is effected by a "tube expander" embodying, substantially, two or more steel rolls gradually spread apart by a conical mandrel. It is inserted in the tube and revolved, or is held stationary while the tube is revolved.

As these implements are in common use for other kindred purposes, I have not thought it necessary to exhibit them in the drawings or describe them further.

As a modification which I regard as an equivalent, I have shown in Fig. 4, a ring, $C^3$, perforated radially; and in Fig. 5, the union of the tubes is shown, as effected by depressing the shell of the outer tube in spots $e'$ registering with the perforations $e$ of the ring. Here also, the ring may be omitted and the perforations made directly in the shell of the inner tube.

I claim as my invention, and desire to secure by Letters Patent of the United States, the following:

1. A tubular metallic post embodying in combination, tubes of different diameter telescoped one within the other, with a split bushing ring interposed, and secured by a peripheral groove rolled in one of the tubes at or adjacent to the ring, thereby holding it in compression against the other tube, substantially as set forth.

2. A tubular metallic post, embodying in combination, tubes of different diameters telescoped one within the other, with one or more interposed "split" metallic rings against which the tubes are forced and held by radial pressure in opposite radial directions, substantially as set forth.

3. A tubular metallic post embodying in combination, tubes of different diameters telescoped one within the other, with an interposed split bushing-ring peripherally grooved, and secured by rolling a peripheral groove in one of the tubes to expand the metal into the grooved ring and compress the same against the outer tube, substantially as set forth.

In testimony whereof I have hereunto set my hand in the presence of two subscribing witnesses.

WM. ANDREW.

Witnesses:
L. M. HOSEA,
LANDON FREYBLER.